United States Patent [19]

Pitter et al.

[11] Patent Number: 4,697,798

[45] Date of Patent: Oct. 6, 1987

[54] APPARATUS FOR LIFTING EQUIPMENT

[75] Inventors: Andreas Pitter; Werner Stenkamp, both of Schortens, Fed. Rep. of Germany

[73] Assignee: Isetron Industrie-und Sicherheits-Elektronik GmbH, Wilhelmshaven, Fed. Rep. of Germany

[21] Appl. No.: 789,326

[22] Filed: Oct. 21, 1985

[30] Foreign Application Priority Data

Oct. 24, 1984 [DE] Fed. Rep. of Germany ....... 3438985

[51] Int. Cl.$^4$ ........................... F16F 9/00; F16F 1/06; G01L 5/00; F16M 13/00
[52] U.S. Cl. .................................. 267/70; 73/862.56; 248/542; 248/613; 267/168
[58] Field of Search ............... 267/70, 69, 71-74, 267/152, 168, 4, 33; 188/1.11; 248/542, 613; 73/862.56, 11, 161; 177/47

[56] References Cited

U.S. PATENT DOCUMENTS

| 343,946 | 6/1886 | Chamberlayne | 267/73 |
|---|---|---|---|
| 2,298,216 | 10/1942 | Lamberger et al. | 73/862.56 |
| 2,437,631 | 3/1948 | Wood | 248/613 |
| 2,480,487 | 8/1949 | Loepsinger | 248/613 |
| 2,678,796 | 5/1954 | Roy | 248/613 |
| 3,637,174 | 1/1972 | Kuo | 248/542 |
| 4,025,011 | 5/1977 | Rapps | 267/69 X |
| 4,502,006 | 2/1985 | Goodwin et al. | 188/1.11 X |

FOREIGN PATENT DOCUMENTS

| 2005557 | 2/1970 | Fed. Rep. of Germany | 267/168 |
|---|---|---|---|
| 3119806 | 12/1982 | Fed. Rep. of Germany | . |
| 3312881 | 11/1984 | Fed. Rep. of Germany | 188/1.11 |

Primary Examiner—Andres Kashnikow
Assistant Examiner—Robert J. Oberleitner
Attorney, Agent, or Firm—Fleit, Jacobson, Cohn & Price

[57] ABSTRACT

The invention relates to an apparatus for lifting equipment for interposing in the force flow path between the lifting equipment or the driving mechanism thereof and a load to be moved, with e.g. a transducer for detecting the load states. In known lifting equipment, it has been found that critical load states are admittedly detected, but are not adequately compensated or cannot be counteracted soon enough. For this purpose, the invention provides at least one mechanism for intermediately storing or at least partly converting the mechanical energy introduced by a load movement into other energy forms, the transducer being coupled in non-positive manner to the mechanism.

6 Claims, 2 Drawing Figures

APPARATUS FOR LIFTING EQUIPMENT

BACKGROUND OF THE INVENTION

The present invention relates to an apparatus for use with lifting equipment.

Such lifting equipment is e.g. known from No. DE 31 19 806 A1. In the case of this known lifting equipment, a transducer is e.g. directly incorporated ino the force flow path between the supporting structural components of the lifting equipment and a load to be moved by the latter. Admittedly this transducer detects the load states which occur very well. However, from the standpoint of a compensating or adapting device, such as e.g. a damping device in connection with the vibrations which occur, it can make no contribution to the operation of the lifting equipment, because it is substantially rigidly bound into the force flow path.

Lifting equipment, such as e.g. crane installations, which are used for raising and lowering loads and optionally for horizontally moving and conveying such loads, are exposed to considerable additional loads due to the acceleration and deceleration of said load masses. An important and critical load state particularly occurs in the case of raising or breaking loose of a maximum load from the ground with a corresponding nominal lifting speed. Load states can occur, which can be a multiple of the nominal load. On raising an excessive load, as can occur in the case of goods having an undefined weight, or in the case of locking a nominal load conveyed at a nominal lifting speed, the corresponding lifting equipment must be able to absorb the forces which occur or the resulting energy values of the moved loads. In order to be able to deal with such critical load states from the safety standpoint, the lifting equipment and their units are generally overdimensioned. A factor which also determines the overdimensioning is e.g. the lifting load factor, as defined in Deutsche Industrie-Norm (i.e., German industrial standard) 15018, sheet 1. Nevertheless, in the case of the aforementioned critical load states, the units and elements of the lifting equipment, e.g. the supporting structural components or the cables of a pulley block used can generally only compensate or store fractions of the total movement energy occurring during these critical load states without suffering damage. As a result, the lifting equipment is subject to very marked wear as a result of such critical load states and fatigue phenomena to materials prematurely occur, which can in some cases even lead to total destruction of the lifting equipment.

SUMMARY OF THE INVENTION

On the basis of these disadvantages of known lifting equipment, the problem of the invention is to design an apparatus in the sense of an adapting means, which can restore critical load states as rapidly as possible to nominal load states or can detect these during the formation phase and if possible compensate them. This makes it posible to reduce the overdimensioning of the lifting equipment normally needed for safety reasons, so that less expensive designs can be used.

The basic principle of the invention is to design the apparatus in such a way that in the case of critical load states, there is at least one intermediate storage of the mechanical energy caused by said states or even the partial dissipation or conversion thereof into other energy forms, e.g. into thermal energy. In order to be able to detect these load states during the formation phase, a transducer of the type described e.g. in No. DE 31 19 806 A1 is coupled non-positively to the energy intermediate storage or conversion means.

In this connection between the transducer and the aforementioned means, it is advantageously posssible at the start of raising a useful load to keep the lifting speed very low in the initial stage and then gradually raise it to the nominal lifting speed. As a result of the means designed as a spring mechanism for the intermediate storage or dissipation of the energy, compared with known lifting equipment, there is a relatively soft resilience and good elasticity, so that e.g. the lifting load factor can be considerably reduced. As said lifting load faactor is included as an overdimensioning factor when calculating the permitted lifting loads, corresponding lifting equipment can be realised less expensively, even when taking account of the critical load states which occur.

Appropriately the spring mechanism has a resultant spring load deflection curve, which has a progressive configuration in the overall function. The resultant spring load deflection curve can result both from the superimposing of two or more spring load deflection curves as from the zero point of an acting force. However, the resultant spring load deflection curve can also result from an operation in time and spring excursion manner, i.e. in the sense of a stepped operating mode.

In the initial load range, e.g. on raising or breaking away of a load from the ground, the progressive configuration of the spring load deflection curve leads to greater sensitivity with respect to intermediate energy storage or detecting only slightly differing load states. However, as a result of the pregressive configuration of the spring load deflection curve, the apparatus is also designed for critical load states, so that in such phases the full function of the load state detection, intermediate storage and damping of the introduced energy, etc. is maintained. Thus, the spring mechanism is advantageously designed in such a way that there is a residual spring excursion in critical load states, so that the spring mechanism "cannot strike the block".

Advantageously the spring mechanism comprises two telescoped springs.

For the rapid detection of the operating states which occur, it is possible to upstream or downstream connect or in some other way integrate with the spring mechanism a transducer, e.g. according to No. DE 31 19 806 A1. Apprropriately such a transducer is connected upstream of the spring mechanism, so that the forces introduced through the raising of the load can act directly or indirectly via an intermediate member on the transducer by means of the cable connected to the load. This makes it possible to detect the instantaneous operating state of the lifting equipment, both in time and unfalsified by possible damping elements.

In the case of a telescopic design of the spring mechanism, such as is e.g. realisable in the case of helical springs by a radial arrangement of one spring in the other, despite its compact construction, the apparatus can permit a relatively large spring excursion for compensating corresponding load states. As a function of the intended use and use conditions, the apparatus can also have more than two spring units, which can be given different constructions or a different operating principle. In place of helical springs, it is possible to e.g. use cup springs, elastomer elements or hydraulic means. Obviously the translatory and axial operation of the apparatus can be modified to give a rotary torsional operation.

In the aforementioned example, the apparatus can be articulated or rigidly connected to components of the lifting equipment supporting mechanism at the casing end opposite to the cable.

If the damping characteristic of the spring mechanism is not sufficient for particular applications, it is also possible to connect a damping device to the spring mechanism. Appropriately the damping device would be interposed in the force flow between the individual springs, so that when vibrations occur optimum damping would be achieved for all conceivable operating states.

As known lifting equipment often functions with several, optionally pulley block-like lifting means, an adaptation of the corresponding cable ends to the zero or neutral position may be necessary. For such cases, the apparatus provides an intermediate member, which can be coupled on the one hand to the transducer and on the other to the cable end. Advantageously this intermediate member is constructed in sleeve-like manner, so that a rotation of the sleeve can bring about a shortening or lengthening with respect to the cable end point.

In addition to or as an alternative to the transducer, it is possible to provide sensors, e.g. in the form of switch ledges, in the path of the spring mechanism, which detect the load state of the apparatus and the lifting mechanism as a function of the bridged spring path.

DESCRIPTION OF THE DRAWING AND PREFERRED EMBODIMENT

Figure 1:
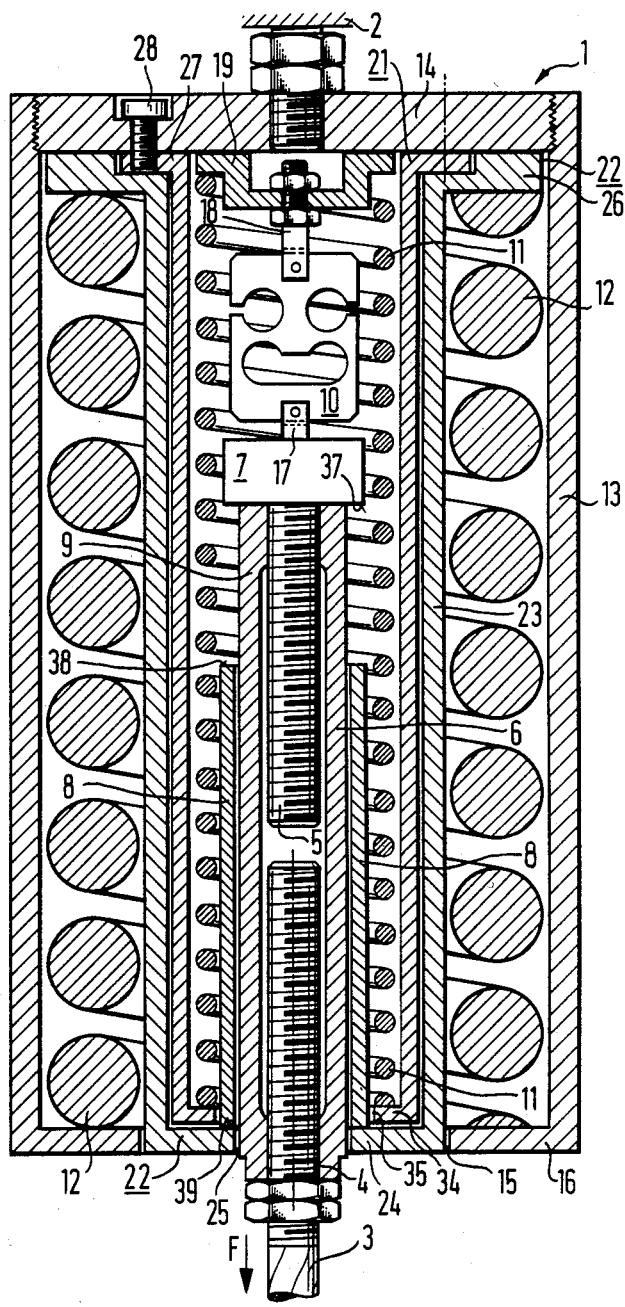
FIG. 1 is a cross-sectional view of an apparatus in accordance with the invention.

The invention is described in greater detail hereinafter relative to a non-limitative embodiment and the attached drawing, wherein is shown an axial section through an apparatus 1 in accordance with the invention, which includes a locking device for the spring excursion of a first spring.

Apparatus 1 shown in axial sectional form in the drawing essentially has an axial symmetrical construction with respect to the median longitudinal axis. Apparatus 1 is e.g. fixed at 2 to supporting structural components of the lifting equipment. At the opposite lower end is shown in the median longitudinal axis that cable end 3 is e.g. connected rigidly or in articulated manner to a lower threaded rod 4 projecting into apparatus 1.

Considered from the radial outside to the inside, apparatus 1 has an approximately cup-shaped casing 13. The latter can be terminated in positive and non-positive manner by a cover plate 14 in the direction of lifting equipment 2. In the vicinity of cable end 3, casing 13 has a casing base 16, which is provided with an e.g. circular opening 15 radially inwardly. On the inner face of the annular casing base 16 is supported a helical spring as the second spring 12.

Radially inwardly is connected to said second spring 12 with a limited radial clearance a pipe element 22 (second pipe element), which on the cover side is connected non-positively to the second spring 12 by a radially outwardly projecting pipe flange 26. The radial dimensions of the second pipe element 22 on pipe flange 26 or on its pipe plate 24 are such that a relative axial displacement of pipe element 22 in casing 13 is possible, the lower part of pipe element 22 then projecting telescopically through opening 15 of casing 13.

Within this substantially U-shaped pipe element 22 is provided a further, first pipe element 21, whih has a roughly identical configuration to pipe element 22, but has radially smaller dimensions This inner, first pipe element 21 is fixed to the cover plate 14 by an upper, radially outwardly projecting pipe flange, e.g. by means of screws 28. Pipe flange 27 of the first pipe element 21 is located in a circular recess of pipe flange 26, so that there is a flush engagement of the two pipe flanges 26, 27 on the inner face of cover plate 14.

The inner, first pipe element 21 projects with a limited radial and axial spacing down to the pipe plate 24 of the outer, second pipe element 22. At the bottom, in the first pipe element 21 is provided a pipe plate 34 which receives a lower end of a spacer bushing 8 and has a radially somewhat larger opening 35 than an opening 25 in pipe element 22.

A first spring 11, which in the present case is also a helical spring extends virtually over the entire axial length of the interior of first pipe element 21. First spring 11 is located at the bottom on the inner face of pipe plate 34 and engages on a stop plate 19 at the cover plate side. In section, stop plate 19 has a shallow U-shape, its diameter being kept smaller than the internal diameter of the first pipe element 21. Stop plate 19 has an area projecting downwards, i.e. into the inner free space of the first spring 11, so that stop plate 19 simultaneously brings about a guidance and a stabilization of the upper end of first spring 11.

The threaded rod 4 projecting from below into the apparatus 1 has a sleeve 6 screwed on to it, which extends thereinto up to the centre of the longitudinal extension of apparatus 1. In the direction of cover plate 14, said sleeve 6 is screwed on to an upper threaded rod 5 or is fixed thereto in some other way. In axial section, upper threaded rod 5 has at the upper end a driver 7, which is rectangular in section. The diameter of driver 7 is such that it projects radially over sleeve 6 and consequently forms a flange-like projecting lower ring face 37. The maximum external diameter of driver 7 is kept such that an axial movement within the first spring 11 is possible.

A transducer 10 is integrated in non-positive manner and optionally rigidly between stop plate 19 and drive 7, such as is e.g. known from No. DE 31 19 806 A1. The radial dimension of the transducer 10 is within the internal diameter of the first spring 11, so that in the case of a force F acting on cable end 3 in the direction of the arrow, intermediate member 9, transducer 10 and stop plate 19 are axially downwardly movable relative to the first spring 11. The intermediate member 9 is formed by the lower and upper threaded rods 4, 5, together with driver 7.

In the left-hand part of the sectional representation is provided the ring-like spacer bushing 8, whose lower end 39 stands on the inner face of the pipe plate 24 of the second pipe element 22. Lower end 39 consequently projects through the base opening 35 of the first pipe element 21. In view of the radial dimensions of spacer bushing 8, this permits an axial displacement of sleeve 6 relative to spacer bushing 8, as well as a compression of first spring 11, which is partly radially positioned between spacer bushing 8 and the inner circumferential surface of the first pipe element.

Pipe elements 21, 22 have the nature of cylindrical bushings 23. The integration or fixing of the transducer 10 is brought about in the present embodiment by means of bolt-like elements 17, 18 to stop plate 19 or driver 7.

The apparatus functions as follows. After switching on the lifting equipment motor, the driving mechanism weights are initially accelerated to the nominal speed and the cable which has not yet been tensioned by the load, i.e. a slackline, is introduced until the cable is loaded by a load, e.g. an object on the ground. Through the buildup of force F, intermediate member 9, together with transducer 10 is moved axially downwards and the first spring 11 is compressed downwards over a corresponding spring travel. The introduced movement and-/or the acting force are detected on transducer 10 and converted into a signal for the lifting equipment driving mechanism, so that then the nominal speed and consequently the maximum lifting speed can be reduced to a settable desired value, which avoids a critical load state, e.g. through vibrations. For example, such a reduction of the speed can be carried out in less than one second, i.e. in 200 to 400 ms.

The expansion or elongation path necessary on raising a load, which was hitherto been absorbed by the cable or other components, can be largely initially bridged by the first spring 11 in the case of apparatus 1, so that there is no significant force rise in the cable as a result of additional expansion.

In the case of an unexpectedly occurring excessive load, transducer 10 and the following electronic evaluation equipment can bring about a rapid disconnection or speed reduction of the driving mechanism.

Apparatus 1 according to the first variant has an operating principle enabling relatively high forces to be measured with a "transmission". According to this operating principle, on introducing a force F, initially only the inner, first spring 11 is loaded, said force acting on the first spring 11 being detected "without" transmission. Due to the force action, transducer 10 and parts 19, 18, 7, 5, 6, 4 and 3 in force flow action therewith are moved downwards. The first spring 11 takes over the introduced force F until the lower ring surface 37 engages with the upper end 38 of spacer bushing 8. It is desirable that in the first phase of force introduction, a maximum spring travel, so to speak an initial spring travel is made available. The latter can be substantially fixed in system-dependent manner by the axial extension of spacer bushing 8, because the initial spring travel is determined by the axial spacing between the lower ring surface 37 and the upper end 38 of the spacer bushing 8. As a result of the relatively soft first spring 11, the force absorbed up to the engagement of the lower ring surface 37 on the upper end 38 of spacer bushing 8 is very small compared with the nominal load. In system-dependent manner, this force can e.g. be approximately 10% of the actual nominal load provided.

Figure 2:
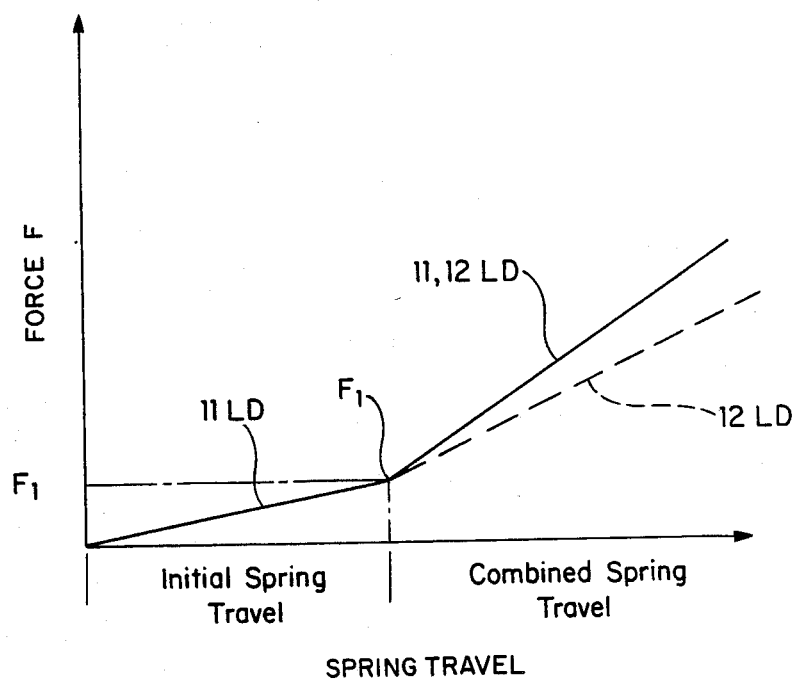
FIG. 2 is a spring load deflection curve diagram for the apparatus of FIG. 1.

As soon as the lower ring surface 37 and the upper end 38 of the spacer bushing come into force engagement with one another, the first and second springs 11, 12 participate in the transfer of the force. The first, inner spring 11 and the second, outer spring 12 are so connected, advantageously in parallel, that the spring excursions or travels covered following the engagement of surfaces 37, 38 are the same for both springs. The force which continues to act following engagement of the two surfaces 37, 38, is subdivided over the first and second springs in accordance with the particular spring rigidity. As the ratio of the spring rigidity of the second spring is 10 or more times higher than that of the first spring, force F is subdivided in this ratio. This is illustrated in FIG. 2, in which it is shown that the first spring 11 has a relatively flatter spring load deflection curve 11LD as compared to a relatively steep load deflection curve 12LD for the second spring 12, with the net combined spring load deflection curve for both springs, beginning at a load force point $F_1$, being shown by a curve 11, 12LD. Transducer 10 detects the spring tension acting on the first spring 11.

As the non-positive action between the lower ring surface 37 and the upper end 38 of spacer bushing 8, e.g. takes place at approximately 10% of the nominal load, with all loading states exceeding roughly 10% the aforementioned power ratio comes into effect, which is particularly advantageous for the force measurement by transducer 10, because higher introduced forces can be absorbed by spring 11, 12, whilst the measurement of force F takes place by transducer 10, which is loaded in the force flow of the first; inner spring 11.

A not-shown measuring line is connected to the transducer for recording and evaluating the force action detected by it. This measuring line is guided as axially as possible in the apparatus, it being e.g. possible to provide a slot or a corresponding bore in driver 7 and a corresponding radial free space in base opening 25. With another connection possibility, said measuring line can also be guided upwards, e.g. through the stop plate 19 and then through cover plate 14.

As a function of the intended use of the apparatus, the second spring 12 with the greater rigidity can be designed in such a way that in critical operating states, such as e.g. an emergency stop, the resulting energy, such as the vibratory energy can be almost completely absorbed by the second spring. In addition or as an alternative to transducer 10, both along the path of the first spring 11 and the second spring 12, it is possible to provide sensors in the manner of switch ledges, which can supply an electric signal on bridging a corresponding spring excursion and this is functionally related to the load state.

Obviously further modifications can be made to apparatus 2. In the case of a corresponding design of the first spring 11, the second spring 12 can e.g. be completely eliminated. This can also be the case if e.g. when apparatus 1 is in use, there can be no locking of the load. In other constructions, e.g. the first pipe element 21 can be eliminated, so that the first spring 11 is directly supported on pipe element 22 and there is consequently a direct force transfer from the first spring 11 to the second spring 12 without spring excursion blocking. Helical spring is a synonym for spiral spring.

What is claimed is:

1. An apparatus for use with lifting equipment and capable of being interposed in a force flow path between the lifting equipment and a load to be lifted, comprising:
   first and second connector means for connecting the apparatus to respective ones of the load and the lifting equipment, said first connector means being movable relative to said second connector means when the load is lifted by the lifting equipment;
   first resilient spring means for absorbing an initial force produced by the lifting equipment in lifting the load, said first resilient spring means being compressible by movement of said movable first connector means, and said movable first connector means including a transducer for detecting load states and being non-positively coupled between the load and said first resilient spring means;

second resilient spring means cooperable with said first resilient spring means for absorbing additional lifting force after said first connector means has moved a predetermined distance and has compressed said first resilient spring means a predetermined amount to absorb said initial force, said first and second resilient spring means being telescopingly and coaxially arranged with said second resilient spring means at least partially surrounding said first resilient spring means;

movable compression means for causing compression of said second resilient spring means;

abutment means on said first connector means and said compression means engagable after said first connector means has moved the predetermined amount, for causing movement of said movable compression means and causing compression of said second resilient spring means together with said first resilient spring means, said first resilient spring means being of less rigid construction then said second resilient spring means and thus having a flatter spring load deflection curve than said second resilient spring means;

first support means fixedly mounted on said second connector means for precluding movement of one end of said first resilient spring means;

second support means fixedly mounted on said second connector means for precluding movement of one end of said second resilient spring means;

a first vertically movable member forming part of said compression means for said second resilient spring means and having an end portion engaged with an opposite end of said second resilient spring means;

a second vertically movable member having an end portion engaged with an opposite end portion of said first vertically movable member; and a driver member forming a part of said first connecting means and having a portion engagable with an opposite end portion of said second vertically movable member for moving said first and second vertically movable members to compress said second resilient spring means, said engagable portions of said driver member and second vertically movable member forming said abutment means.

2. An apparatus for use with lifting equipment and capable of being interposed in a force flow path between the lifting equipment and a load to be lifted, comprising:

first and second connector means for connecting the apparatus to respective ones of the load and the lifting equipment, said first connector means being movable relative to said second connector means when the load is lifted by the lifting equipment;

first resilient spring means for absorbing an initial force produced by the lifting equipment in lifting the load, said first resilient spring means being compressible by movement of said movable first connector means, and said movable first connector means including a transducer for detecting load states and being non-positively coupled between the load and said first resilient spring means;

second resilient spring means cooperable with said first resilient spring means for absorbing additional lifting force after said first connector means has moved a predetermined distance and has compressed said first resilient spring means a predetermined amount to absorb said initial force, said first and second resilient spring means being telescopingly and coaxially arranged with said second resilient spring means at least partially surrounding said first resilient spring means;

movable compression means for causing compression of said second resilient spring means;

abutment means on said first connector means and said compression means engagable after said first connector means has moved the predetermined amount, for causing movement of said movable compression means and causing compression of said second resilient spring means together with said first resilient spring means, said first resilient spring means being of less rigid construction then said second resilient spring means and thus having a flatter spring load deflection curve than said second resilient spring means;

a cylindrical member fixedly mounted on said second connector means and surrounding said first resilient spring means, said cylindrical member including retaining means for limiting movement of a lower end of said first resilient spring means;

an axially movable cylindrical member forming part of said compression means for said second resilient spring means, said movable cylindrical member surrounding said fixedly mounted cylindrical member and having an upper end portion engaged with an upper end portion of said second resilient spring means for compressing said second resilient spring means;

a spacer bushing disposed radially inward of said fixedly mounted cylindrical member and said first resilient spring means and having a lower end portion engaged with a lower end portion of said movable cylindrical member, said spacer bushing being axially movable to cause axial movement of said second cylindrical member; and a driver member forming a part of said load connecting means and rigidly connected to said transducer, with a portion of said driver member and an upper end portion of said spacer bushing being engagable and defining said abutment means.

3. An apparatus according to claim 2, wherein said load connecting means further includes a screw-threaded adjustment means connected between said driver member and a lift cable attachment end of said load connecting means for longitudinally and vertically setting a cable end fixed to said load connecting means.

4. An apparatus for use with lifting equipment and capable of being interposed in a force flow path between the lifting equipment and a load to be lifted, comprising:

first and second connector means for connecting the apparatus to respective ones of the load and the lifting equipment, said first connector means being movable relative to said second connector means when the load is lifted by the lifting equipment;

first resilient spring means for absorbing an initial force produced by the lifting equipment in lifting the load, said first resilient spring means being compressible by movement of said movable first connector means, and said movable first connector means including a transducer for detecting load states and being non-positively coupled between the load and said first resilient spring means, said non-positively coupled transducer directly measuring forces caused by the load during the initial compression of said first resilient spring means, while higher forces causing said second resilient spring means to be compressed along with said first resilient spring means cause the forces to be subdivided between said first and second resilient spring means, respectively, whereupon said transducer measures the subdivided force in said first resilient spring means, thereby expanding the measuring capability of said transducer;

second resilient spring means cooperable with said first resilient spring means for absorbing additional lifting force after said first connector means has moved a predetermined distance and has compressed said first resilient spring means a predetermined amount to absorb said initial force, said first and second resilient spring means being telescopingly and coaxially arranged with said second resilient spring means at least partially surrounding said first resilient spring means;

movable compression means for causing compression of said second resilient spring means;

abutment means on said first connector means and said compression means engagable after said first connector means has moved the predetermined amount, for causing movement of said movable compression means and causing compression of said second resilient spring means together with said first resilient spring means, said first resilient spring means being of less rigid construction then said second resilient spring means and thus having a flatter spring load deflection curve than said second resilient spring means;

first support means fixedly mounted on said second connector means for precluding movement of one end of said first resilient spring means;

second support means fixedly mounted on said second connector means for precluding movement of one end of said second resilient spring means;

a first vertically movable member forming part of said compression means for said second resilient spring means and having an end portion engaged with an opposite end of said second resilient spring means;

a second vertically movable member having an end portion engaged with an opposite end portion of said first vertically movable member; and a driver member forming a part of said first connecting means and having a portion engagable with an opposite end portion of said second vertically movable member for moving said first and second vertically movable members to compress said second resilient spring means, said engagable portions of said driver member and second vertically movable member forming said abutment means.

5. An apparatus for use with lifting equipment and capable of being interposed in a force flow path between the lifting equipment and a load to be lifted, comprising:

first and second connector means for connecting the apparatus to respective ones of the load and the lifting equipment, said first connector means being movable relative to said second connector means when the load is lifted by the lifting equipment;

first resilient spring means for absorbing an initial force prodcued by the lifting equipment in lifting the load, said first resilient spring means being compressible by movement of said movable first connector means, and said movable first connector means including a transducer for detecting load states and being non-positively coupled between the load and said first resilient spring means, said non-positively coupled transducer directly measuring forces caused by the load during the initial compression of said first resilient spring means, while higher forces causing said second resilient spring means to be compressed along with said first resilient spring means cause the forces to be subdivided between said first and second resilient spring means, respectively, whereupon said transducer measures the subdivided force in said first resilient spring means, thereby expanding the measuring capability of said transducer;

second resilient spring means cooperable with said first resilient spring means for absorbing additional lifting force after said first connector means has moved a predetermined distance and has compressed said first resilient spring means a predetermined amount to absorb said initial force, said first and second resilient spring means being telesopingly and coaxially arranged with said second resilient spring means at least partially surrounding said first resilient spring means;

movable compression means for causing compression of said second resilient spring means;

abutment means on said first connector means and said compression means engagable after said first connector means has moved the predetermined amount, for causing movement of said movable compression means and causing compression of said second resilient spring means together with said first resilient spring means, said first resilient spring means being of less rigid construction then said second resilient spring means and thus having a flatter spring load deflection curve than said second resilient spring means;

a cylindrical member fixedly mounted on said second connector means and surrounding said first resilient spring means, said cylindrical member including retaining means for limiting movement of a lower end of said first resilient spring means;

an axially movable cylindrical member forming part of said compression means for said second resilient spring means, said movable cylindrical member surrounding said fixedly mounted cylindrical member and having an upper end portion engaged with an upper end portion of said second resilient spring means for compressing said second resilient spring means;

a spacer bushing disposed raadially inward of said fixedly mounted cylindrical member and said first resilient spring means and having a lower end portion engaged with a lower end portion of said movable cylindrical member, said spacer bushing being axially movable to cause axial movement of said second cylindrical member; and a driver member forming a part of said load connecting means and rigidly connected to said transducer, with a portion of said driver member and an upper end portion of said spacer bushing being engagable and defining said abutment means.

6. An apparatus according to claim 5, wherein said load connecting means further includes a screw-threaded adjustment means connected between said driver member and a lift cable attachment end of said load connecting means for longitudinally and vertically setting a cable end fixed to said load connecting means.

* * * * *